Aug. 29, 1967     R. G. BOARD ET AL     3,338,532
RETRACTABLE SAFETY BELTS
Filed Aug. 27, 1965                    2 Sheets-Sheet 1

INVENTORS
RICHARD G. BOARD
NELSON H. SHAPIRO
BY  Shapiro and Shapiro
ATTORNEYS

United States Patent Office 3,338,532
Patented Aug. 29, 1967

3,338,532
RETRACTABLE SAFETY BELTS
Richard G. Board, Bethesda, Md. (3000 Connecticut Ave., Washington, D.C. 20008), and Nelson H. Shapiro, Hyattsville, Md. (640 Washington Bldg., Washington, D.C. 20005)
Filed Aug. 27, 1965, Ser. No. 483,074
14 Claims. (Cl. 242—107.4)

Copending application Ser. No. 417,924, filed Dec. 14, 1964 for Retractable Safety Belts discloses and claims retractable seat belt apparatus in which a strap having a fastener member at a free end thereof may be grasped by the user and extended from a retraction device to place the strap in user-restraining position, whereupon further extension of the strap is prevented automatically in response, for example, to the cessation of extensile movement or to slight retractile movement of the strap. At the user-restraining position the strap may have any selected length within a wide range of lengths, so as to accommodate varying conditions of user size and clothing. The fastener member is engaged with a mating fastener member in order to complete the belt. When the fastener members are disengaged, the strap retracts automatically.

More specifically, the foregoing copending application discloses and claims retractable seat belt apparatus and the like having a locking member, such as a pin, past which the strap is trained, the member being located at a first position during desired extension of the strap, at which the member is ineffective to prevent extensile movement of the strap. After the strap has been extended, the member is moved automatically to a second position, at which the member prevents further extensile movement of the strap. After the strap has been retracted to a predetermined extent, the member is returned to its first position.

It is a principal object of the present invention to provide improved apparatus of the foregoing type.

Another object of the invention is to provide improved retractable seat belt apparatus and the like in which the operation of a locking member for preventing undesired extensile movement of the belt is under control of the belt itself.

Still another object of the invention is to provide improved apparatus of the foregoing type employing a pawl and ratchet mechanism in which the pawl is held out of engagement with the ratchet teeth during desired extension of a retractable seat belt, for example, is then permitted to engage the teeth for preventing further extensile movement, and is held out of engagement with the teeth during retractile movement of the belt but immediately re-engages the teeth if an extensile pull is exerted upon the belt, unless the belt has been retracted to a predetermined extent.

An additional object of the invention is to provide apparatus of the foregoing type in which the pawl rotates and translates.

Another object of the invention is to provide automatically locking retractable seat belt apparatus and the like having exceptional simplicity, compactness, economy, and freedom from operating noise.

A further object of the invention is to provide improved means for quieting a pawl and ratchet mechanism.

The foregoing and other objects, advantages, and features of the invention, and the manner in which the same are accomplished will become more readily apparent upon consideration of the following detailed description of the invention taken in conjunction with the accompanying drawings, which illustrate preferred and exemplary embodiments, and wherein.

Briefly stated, but without limitation, a preferred embodiment of the invention utilizes a spring-wound retraction reel having ratchet wheels affixed to its ends and rotatably supported between the side plates of a frame. A pawl member or pin has its ends supported for rotation and for translation along the frame in suitably shaped slots in the side plates of the frame and extends transversely of the side plates parallel to the axis of rotation of the reel. The pin constitutes a roller and has a central section or strap guide over which the strap is trained from the reel, with a change in strap direction, so that the strap exerts lateral thrust forces upon the pin proportional to the tension of the strap and thus is capable of causing the pin to rotate and translate. During retraction of the strap, the pawl pin is carried by the ratchet teeth along the periphery of the reel to a position at which the pin disengages the teeth, thereby avoiding ratchet noise. However, if a pull is exerted upon the strap, the pawl pin immediately moves back into engagement with the teeth and is carried to a locking position at which further extensile rotation of the ratchet wheels is prevented. When the strap is substantially fully wound upon the reel, the pawl pin is prevented from moving to its locking position and instead is carried to still another (unlocked) position upon initial extensile movement of the strap, where the pin remains during extension of the strap to the desired length. If now the strap is relaxed slightly, the pin moves to its locking position.

Figures 1, 2, 3, 4:
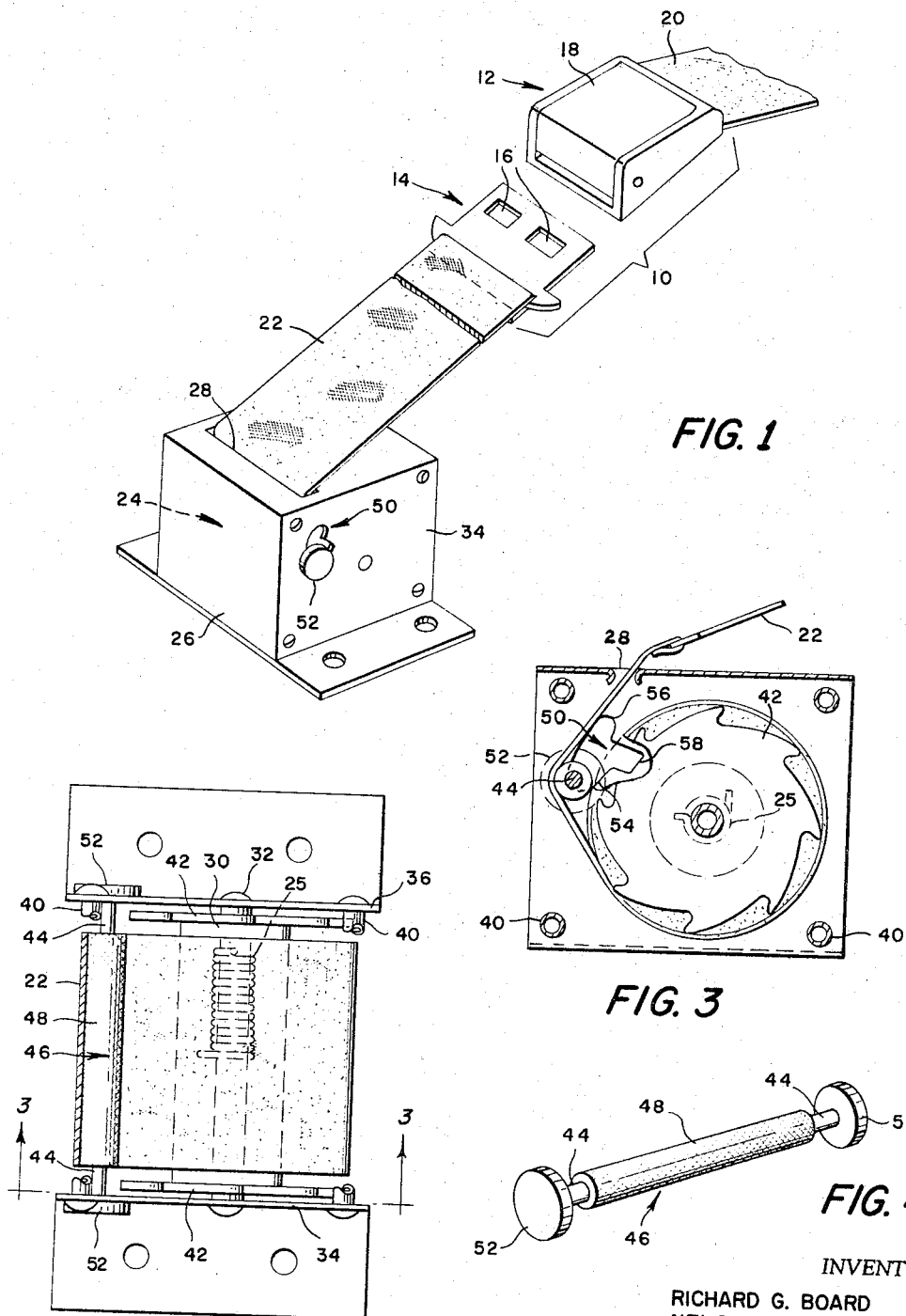
FIGURE 1 is a perspective view illustrating the external appearance of housing, strap, and fastener components of a typical embodiment of retractable seat belt apparatus in accordance with the invention.
FIGURE 2 is a horizontal sectional view illustrating apparatus contained within the housing shown in FIGURE 1.
FIGURE 3 is a vertical sectional view taken along line 3—3 of FIGURE 2.
FIGURE 4 is a perspective view of a pawl pin employed in the invention.

Referring to the drawings, and initially to FIGURE 1 thereof, reference numeral 10 designates a conventional seat belt fastener couple comprising a buckle 12 and a tongue 14. The fastener parts may have the usual construction, the buckle comprising a housing having an access opening at the front for reception of the tongue and including the usual locking abutments which enter the openings 16 of the tongue so as to retain the tongue in the buckle until the buckle release lever 18 is actuated. A strap 20 affixed to the buckle may have its distal end anchored to the floor of the vehicle at one side of the seat, for example. The strap may be kept quite short, may be rigidified, and need not be adjustable. Strap 22, such as nylon webbing, is affixed to the tongue and is arranged to be retracted and extended with respect to a retraction device 24, which may be a spring-wound retraction reel supported for rotation in a housing or casing 26 anchored to the floor of the vehicle at the opposite side of the seat, for example. The housing may be appropriately contoured to minimize space requirements and for aesthetic reasons and may have an opening 28 through which the strap 22 moves and at which the tongue 14 is located when the strap is fully retracted. As is well known in the art, the reel 24 (FIGURE 2) may comprise a tubular hub 30 having bearings (not shown) at each end for supporting the hub for rotation upon a pin 32 extending axially through the hub and fixed between side plates 34 and 36 of the frame, which may be part of the housing 26. A helical torsion spring 25 is received loosely within the hub between the hub and the pin 32 and has one end fixed to the pin and the other end fixed to the hub, so that the spring is wound when the reel is turned in a direction to extend the strap. Other types of reels, such as those using spiral clock springs at the ends, may also be used. The side plates 34 and 36 may be joined by spacers 40, and the opening 28 at the top of the housing may be provided with guide surfaces (see FIGURE 3) to direct the strap 22.

In accordance with the invention the retraction reel is provided with a ratchet wheel 42 fixed to each end of the hub. The teeth of the ratchet wheels are shaped to prevent clockwise (extensile) rotation of the reel as viewed in FIGURE 3, when engaged with pawls 44 at the ends of a pawl pin or roller 46 (FIGURE 4), the central section 48 of which is of large enough diameter to engage the webbing wound upon the reel when the reel is substantially full and to lift the pawls from the teeth when so engaged (see FIGURE 3).

The pawl pin extends transversely of the side plates 34 and 36 and has its ends received in and supported upon the edges of opposed identical slots 50 formed in the side plates. The pawl pin is substantially parallel to the axis of the reel and may be provided with a pair of end discs 52 to prevent appreciable axial movement of the pin or skewing.

Figure 7:
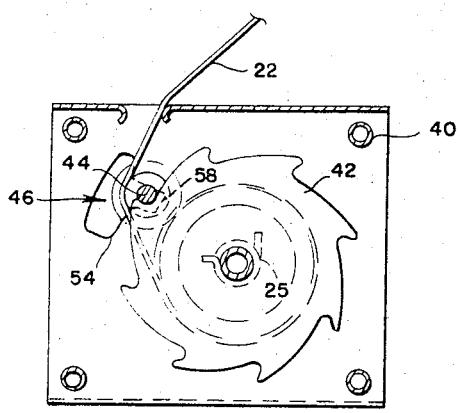

Slots 50 are generally T-shaped, each slot having a stem portion 52 extending in a generally radial direction and a generally tangential cap portion with lower edges constituting a pair of shelves 54 and 56 at opposite sides of the stem portion, the shelf 56 being more distant from the axis of the reel than the shelf 54. The bottom edge 58 of the slots (with reference to the axis of the reel) is closer to the reel axis than the troughs of the ratchet teeth. When the pawls 44 rest in the stem portions 52 as shown in FIGURE 7, the pawls are in a position to engage the locking surfaces of the ratchet teeth and the opposing edges of the slots below shelves 56 and to prevent extensile rotation of the reel. Any extensile pull upon the strap 22 forces the pawls more tightly into locking position. The edges of the slots below the shelves 56 may be undercut somewhat, as shown, to facilitate the locking action.

Figure 5:
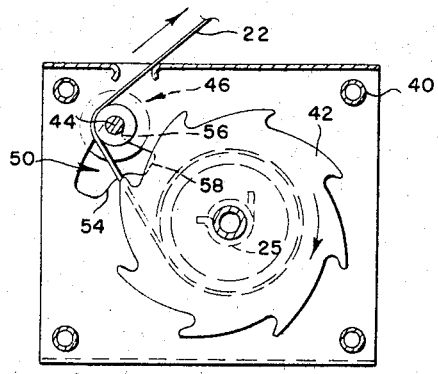
FIGURES 5, 6 and 7 are sectional views similar to FIGURE 3 and illustrating different positions of the apparatus of the invention.

During desired extension of the strap to its user-restraining position, the pawls rest upon the shelves 56 as shown in FIGURE 5 (being brought there in a manner to be described hereinafter) and the pawls are disengaged from the ratchet teeth. The extensile movement of the strap causes rotation of the pawl pin. This rotation and the drag and pressure exerted by the strap keep the pin in this position. After the strap has been extended sufficiently and is relaxed slightly or permitted to retract slightly, the pawl pin snaps down from the shelves 56 onto the ratchet teeth as shown in FIGURE 7. This is caused by slight reverse rotation of the pin and by relaxation of the forces tending to keep the pin on the shelves during extension of the strap. Substantial extensile movement of the reel and strap is then prevented as described above.

Figure 6:
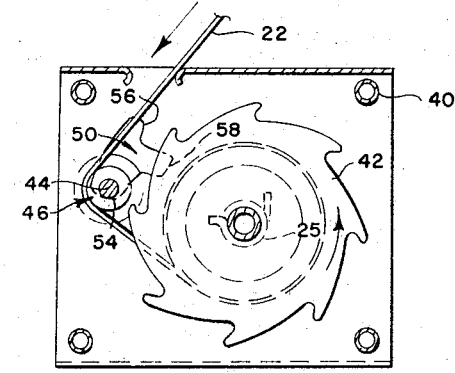

If now the strap is permitted to retract appreciably, the pawl pin is carried by the ratchet teeth and by engagement with the strap (counterclockwise in FIGURE 7) until it is lifted by the teeth onto the shelves 54 as shown in FIGURE 6. The pin moves back upon the shelves, due to its rotation and the drag exerted thereon by the retracting strap, until the pawls disengage the ratchet teeth (or engagement is substantially reduced), so that the retractile rotation of the reel is silent. If the pin rests upon shelves 54 when the belt is in use and if an extensile pull is exerted upon the strap when the pawl pin is in this position, the pin immediately snaps down to the position of FIGURE 7, due to the drag and pressure exerted thereon by the strap and due to the rotation of the pin, and further extensile movement of the strap is prevented.

When the strap is substantially fully retracted upon the reel, as shown in FIGURE 3, the wound webbing engages the central portion of the pawl pin and forms a bridge between the shelves 54 and 56. When the strap is pulled and the reel is turned in an extensile direction, the pin, trapped between the underlying layer of wound webbing and the overlying layer moving through the opening 28, is moved bodily to the shelves 56, where it remains, as described above, until extensile movement has ceased.

Figure 8:
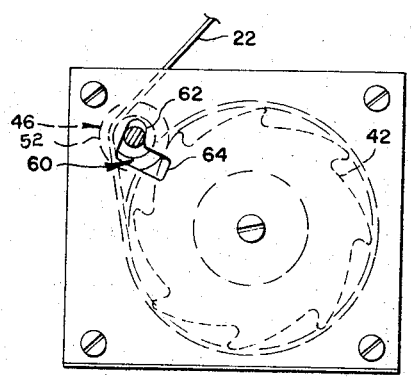
FIGURES 8 and 9 are similar sectional views illustrating different positions of a modified form of apparatus.
Figure 9:
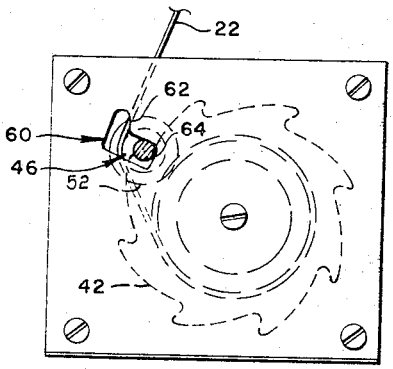

FIGURES 8 and 9 illustrate a modified embodiment in which each of the slots 60 of the side plates has only a single shelf 62, upon which the pawl pin is supported during the desired extension of the strap. The pin snaps down into the radial or lower leg 64 of the slots when the strap is relaxed somewhat, after extension to the desired length. The pin is lifted to the level of the shelves 62 by engagement of the central portion of the pin with the wound webbing when the strap is substantially fully wound upon the reel. The initial extensile movement of the strap is effective to place the pin upon the shelves 62.

While preferred embodiments of the invention have been shown and described, it will be apparent to those skilled in the art that modifications can be made without departing from the principles and the spirit of the invention, the scope of which is defined in the appended claims. Thus, as disclosed in the aforesaid copending application, the pawl need not be a roller. It may be a slider which is subjected to the drag forces of the webbing passing over it. Moreover, it is not necessary that the ends of the pin which move in the slots be of the same size or configuration as the pawls proper. Larger pawls may be employed and may engage bearing abutments affixed to the inner surfaces of the side plates when the pawls are in locking position. Reference is made to copending applications, Ser. No. 444,658, filed Apr. 1, 1965, and Ser. No. 464,369, filed June 16, 1965, for further disclosure with respect to the movement of pins upon slotted side plates under the influence of forces exerted by strap tension and webbing wound upon reels. Accordingly, the foregoing embodiments are to be considered illustrative, rather than restrictive of the invention, and those modifications which come within the meaning and range of equivalents of the claims are to be included therein.

The invention claimed is:

1. Retractable seat belt apparatus and the like comprising a spring-wound retraction reel supported for rotation between a pair of side plates of a frame, a strap connected to said reel for retraction and extension, a pair of ratchet wheels provided at the ends of said reel for rotation therewith, said side plates having a pair of opposed slots, and a pawl pin extending between said slots and having its ends supported therein, each of said slots having a locking portion and having a pair of shelf portions at opposite sides of said locking portion more distant from the axis of rotation of said reel than said locking portion, said strap being trained from said reel over said pin with a change in direction, whereby the strap exerts forces upon said pin, said pin engaging the teeth of said ratchet wheels and preventing substantial rotation of said reel when the pin ends are located in said locking portion and being lifted from said locking portion to one of the shelves of said slots by the ratchet teeth during retraction of the strap, said pin having a central portion engaging the strap wound upon said reel after a predetermined amount of strap has been retracted, the wound strap then bridging the gap between the shelves of each slot and carrying said pin from said one shelf of each slot to the other shelf of each slot upon initial extension of said strap, said other shelves being radially beyond the ratchet teeth whereby said pin may remain upon said other shelves during desired extension of said strap, with the pin disengaged from said teeth, said pin being forced from said other shelves to said locking portions when said strap is relaxed somewhat after its extension.

2. The apparatus of claim 1, said pin being generally cylindrical and constituting a roller for turning movement upon said shelves.

3. The apparatus of claim 1, said slots being generally T-shaped.

4. Retractable seat belt apparatus and the like, comprising a spring-wound retraction reel rotatably supported between a pair of side plates of a frame, a strap connected to said reel for retraction and extension, said reel having ratchet wheel means affixed thereto for rotation therewith, a pawl pin extending between said side plates substantially parallel to the axis of rotation of said reel, said side plates having a pair of slots for supporting the respective ends of said pawl pin for movement therein, said slots having a generally radial locking portion and having a generally tangential shelf portion, said strap being trained about said pin with a change in direction, whereby said strap may exert forces upon said pin, said pin having a central portion engaging the strap upon said reel after a predetermined amount of strap has been retracted, for lifting said pin substantially to the level of said shelves, said pin remaining upon said shelves during desired extension of said strap and the shelves being radially beyond the teeth of the ratchet wheel means to prevent engagement of said pin with the teeth, said pin moving off of said shelves into said substantially radial portions of said slots in response to relaxation of said strap after extension thereof and engaging the teeth of said ratchet wheel means for preventing substantial rotation of said reel in an extensile direction.

5. A retractable belt or the like comprising a frame, a retraction reel supported for rotation upon said frame and having ratchet wheel means fixed thereto, a strap connected to said reel for retraction and extension, a pawl member mounted upon said frame for movement with respect thereto between a first position, at which said pawl member engages said ratchet wheel means for preventing extensile rotation of said reel, and a second position, at which said pawl member is substantially disengaged from said ratchet wheel means, and means training said strap around said pawl member with predetermined orientation, correlated with the mounting of said pawl member, for exerting a force from said strap upon said pawl member which urges said pawl member to said second position in response to substantial retractile movement of said strap with respect to said frame.

6. The retractable belt of claim 5, said pawl member comprising a roller supported to roll along said frame and being rotated by said strap.

7. The retractable belt of claim 5, said pawl member being mounted for translational movement between said positions along the periphery of said reel.

8. The retractable belt of claim 7, said pawl member being mounted for translational movement with respect to said frame to a third position, and means for supporting said pawl member at said third position disengaged from said ratchet wheel means during desired extension of said strap, said second and third positions being farther from the axis of said reel than said first position.

9. The retractable belt of claim 8, said pawl member having means engaging the strap wound on said reel, when a predetermined amount of strap has been retracted, for carrying said pawl member to said third position when said strap is extended following retraction of said amount.

10. The retractable belt of claim 5, said pawl member being supported upon and carried by said ratchet wheel means during movement of said pawl member from said first position to said second position.

11. A pawl and ratchet mechanism comprising a frame, a ratchet wheel supported on said frame for rotation in opposite directions, a pawl mounted for translation along said frame, said pawl being supported upon the periphery of said wheel in a first pawl position and being carried by said wheel along its periphery between said first position and a second position when said wheel is rotated in one direction, means engaging said pawl at said first position and preventing rotation of said wheel in the other direction, and means for disengaging said pawl from said ratchet wheel in response to movement of said pawl to said second position.

12. The mechanism of claim 11, the last-mentioned means comprising a surface for directing said pawl away from said ratchet wheel as said pawl is moved by said wheel in said one direction.

13. A retractable belt or the like comprising a frame, a retraction reel supported for rotation upon said frame and having ratchet wheel means fixed thereto, a strap connected to said reel for retraction and extension, a pawl pin roller mounted upon said frame adjacent to said reel for rotation and for translation between a locked position, at which the roller engages said ratchet wheel means and prevents rotation of said reel in one direction, and an unlocked position, at which the roller is disengaged from said ratchet wheel means and permits rotation of said reel in said one direction, means for positioning said roller at said unlocked position during desired extension of said strap, and means training said strap from said reel around said roller with predetermined orientation correlated with the mounting of said roller, for exerting a force thereon to rotate the roller at said unlocked position during desired extension of said strap and thereafter to cause said roller to translate from said unlocked position to said locked position.

14. The retractable belt of claim 13, said roller being mounted upon said frame for translation to a further position, at which said roller is disengaged from said ratchet wheel means, said strap being trained to urge said roller from said locked position to said further position during substantial retraction of said strap but to return said roller to said locked position in response to an extensile pull prior to substantially complete retraction of said strap.

References Cited

UNITED STATES PATENTS

| | | | |
|---|---|---|---|
| 1,854,037 | 4/1932 | Johnson | 242—100 |
| 2,569,020 | 9/1951 | Rotherham | 242—107.4 |
| 3,021,089 | 2/1962 | Becker | 242—107.3 |
| 3,100,669 | 8/1963 | Monroe | 297—388 |
| 3,174,704 | 3/1965 | Replogle | 242—107.4 |
| 3,193,327 | 7/1965 | Roe | 297—388 |

FOREIGN PATENTS 125,997 12/1901 Germany.

FRANK J. COHEN, *Primary Examiner.*

W. S. BURDEN, *Assistant Examiner.*